(12) United States Patent
Sugaya (10) Patent No.: US 9,922,239 B2
(45) Date of Patent: Mar. 20, 2018

(54) SYSTEM, METHOD, AND PROGRAM FOR IDENTIFYING PERSON IN PORTRAIT

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/620,924

(22) Filed: Jun. 13, 2017

(65) Prior Publication Data

US 2018/0025216 A1    Jan. 25, 2018

Related U.S. Application Data

(63) Continuation of application No. PCT/JP2016/071109, filed on Jul. 19, 2016.

(51) Int. Cl.
*G06K 9/00* (2006.01)
*G06K 9/62* (2006.01)

(52) U.S. Cl.
CPC ..... *G06K 9/00288* (2013.01); *G06K 9/00228* (2013.01); *G06K 9/00268* (2013.01); *G06K 9/6277* (2013.01)

(58) Field of Classification Search
CPC ........... G06K 9/00228; G06K 9/00268; G06K 9/00288; G06K 9/6277
See application file for complete search history.

(56) References Cited

U.S. PATENT DOCUMENTS

| | | | |
|---|---|---|---|
| 2007/0177805 A1* | 8/2007 | Gallagher | G06F 17/30265 382/190 |
| 2008/0247610 A1 | 10/2008 | Tsunoda | |
| 2009/0252383 A1 | 10/2009 | Adam | |

FOREIGN PATENT DOCUMENTS

| | | |
|---|---|---|
| JP | 07-302271 | 11/1995 |
| JP | 2003-187352 | 7/2003 |
| JP | 2005-078590 | 3/2005 |
| JP | 2008-257460 | 10/2008 |
| JP | 2011-516966 | 5/2011 |
| JP | 2011-107997 | 6/2011 |

OTHER PUBLICATIONS

Masanori, "Machine translation of JP2005078590", Mar. 24 2005, Espace.net, p. 1-17.*
Sablatnig et al., "Hierarchical Classification of Paintings using Face- and Brush Stroke Models", Aug. 1998, IEEE, Proceedings of 14th Int. Conf. on Pattern Recognition, 1998, p. 1-3.*
Edwards et al., "Face Recognition Using Active Appearance Models", Jun. 1998, Springer, Proceedings of 5th European Conf. on Computer Vision, vol. 2, p. 581-595.*

* cited by examiner

*Primary Examiner* — Sean Conner
*Assistant Examiner* — Timothy Choi
(74) *Attorney, Agent, or Firm* — Lex IP Meister, PLLC (57) ABSTRACT

The present invention is to provide a system, a method, and a program for identifying a person depicted in a portrait. The system for identifying a person depicted in a portrait 1 receives input of portrait data of the portrait, stores different individual data depending on a plurality of persons, extracts a feature point of the received portrait by image analysis, checks the extracted feature point against the individual data, identifies a person depicted in the portrait from the check result, and displays the identification result together with a probability corresponding to an identical level.

8 Claims, 8 Drawing Sheets

SYSTEM, METHOD, AND PROGRAM FOR IDENTIFYING PERSON IN PORTRAIT

TECHNICAL FIELD

The present invention relates to a system, a method, and a program for identifying a person depicted in a portrait.

BACKGROUND ART

Recently, an image taken by an imaging device such as a camera has been analyzed to identify a person seen in this image. Such person identification is conducted in various scenes, for example, where an individual is identified or biometrically identified. Furthermore, the constitution that identifies a person seen in a taken image and then other images in which this person is seen by using such person identification is disclosed.

A method of using such person identification analyzes a key image as a search condition and identifies the person ID of a person seen in this key image. The constitution that identifies the cluster to which this person ID is assigned, to select an image in which the person belongs to the same cluster as that of the person seen in the key image is seen is disclosed (refer to Patent Document 1).

CITATION LIST

Patent Literature

Patent Document 1; JP 2011-107997A

SUMMARY OF INVENTION

The constitution of Patent Document 1 is effective against a taken image of an actual person but hardly identifies an actual person depicted in a portrait.

An objective of the present invention is to provide a system, a method, and a program for identifying a person depicted in a portrait.

The first aspect of the present invention provides a system for identifying a person depicted in a portrait, including;

a receiving unit that receives input of portrait data of the portrait;

a memory unit that stores different individual data depending on a plurality of persons;

an extraction unit that extracts a feature point of the received portrait by image analysis;

a check unit that checks the extracted feature point against the individual data;

an identification unit that identifies a person depicted in the portrait from the check result;

a display unit that displays the identification result together with a probability corresponding to an identical level.

According to the first aspect of the present invention, a system for identifying a person depicted in a portrait receives input of portrait data of the portrait, stores different individual data depending on a plurality of persons, extracts a feature point of the received portrait by image analysis, checks the extracted feature point against the individual data, identifies a person depicted in the portrait from the check result, and displays the identification result together with a probability corresponding to an identical level.

The first aspect of the present invention is the category of a system for identifying a person depicted in a portrait, but the categories of a method and a program for identifying a person depicted in a portrait have similar functions and effects.

The second aspect of the present invention provides the system according to the first aspect of the present invention, in which the different individual data are different portrait data.

According to the second aspect of the present invention, in the system according to the first aspect of the present invention, the different individual data are different portrait data.

The third aspect of the present invention provides the system according to the first aspect of the present invention, in which the different individual data are different taken image data.

According to the third aspect of the present invention, in the system according to the first aspect of the present invention, the different individual data are different taken image data.

The fourth aspect of the present invention provides the system according to the first aspect of the present invention, in which the different individual data are different portrait data and different taken image data, and the check unit changes the check procedure based on whether data against which the extracted feature point is to be checked are the different portrait data or the different taken image data According to the fourth aspect of the present invention, in the system according to the first aspect of the present invention, the different individual data are different portrait data and different taken image data, and the system changes the check procedure based on whether data against which the extracted feature point is to be checked are the different portrait data or the different taken image data.

The fifth aspect of the present invention provides the system according to the first aspect of the present invention, in which the extraction unit extracts the feature amount of each part of the received portrait data, and the check unit checks the extracted feature amount of the each part against the same each part of the stored individual data.

According to the fifth aspect of the present invention, the system according to the first aspect of the present invention extracts the feature amount of each part of the received portrait data and checks the extracted feature amount of the each part against the same each part of the stored individual data.

The sixth aspect of the present invention provides the system according to the fifth aspect of the present invention, in which the display unit displays a probability corresponding to the identical level of the each part.

According to the sixth aspect of the present invention, the system according to the fifth aspect of the present invention displays a probability corresponding to the identical level of the each part.

The seventh aspect of the present invention provides the system according to the first aspect of the present invention, in which the display unit displays probabilities corresponding to the respective identical levels together if the number of the identified persons is two or more.

According to the seventh aspect of the present invention, the system according to the first aspect of the present invention displays probabilities corresponding to the respective identical levels together if the number of the identified persons is two or more.

The eighth aspect of the present invention provides the system according to the first aspect of the present invention, in which the display unit displays a reason why the person is identified.

According to the eighth aspect of the present invention, the system according to the first aspect of the present invention displays a reason why the person is identified.

The ninth aspect of the present invention provides the system according to the first aspect of the present invention, in which the display unit displays property information on the identified person.

According to the ninth aspect of the present invention, the system according to the first aspect of the present invention displays property information on the identified person.

The tenth aspect of the present invention provides a method for identifying a person depicted in a portrait, including the steps of:

receiving input of portrait data of the portrait;

storing different individual data depending on a plurality of persons;

extracting a feature point of the received portrait by image analysis;

checking the extracted feature point against the individual data;

identifying a person depicted in the portrait from the check result; and displaying the identification result together with a probability corresponding to an identical level.

The eleventh aspect of the present invention provides a computer program product for use in a system for identifying a person depicted in a portrait, including a non-transitory computer usable medium having a set of instructions physically embodied therein, the set of instructions including computer readable program code, which when executed by the system causes the information processing unit to:

receive input of portrait data of the portrait;

store different individual data depending on a plurality of persons;

extract a feature point of the received portrait by image analysis;

check the extracted feature point against the individual data;

identify a person depicted in the portrait from the check result; and display the identification result together with a probability corresponding to an identical level.

The present invention can provide a system, a method, and a program for identifying a person depicted in a portrait.

DESCRIPTION OF EMBODIMENTS

Embodiments of the present invention will be described below with reference to the attached drawings. However, these are illustrative only, and the technological scope of the present invention is not limited thereto.

Overview of System for Identifying Person Depicted in Portrait 1

Figure 1:
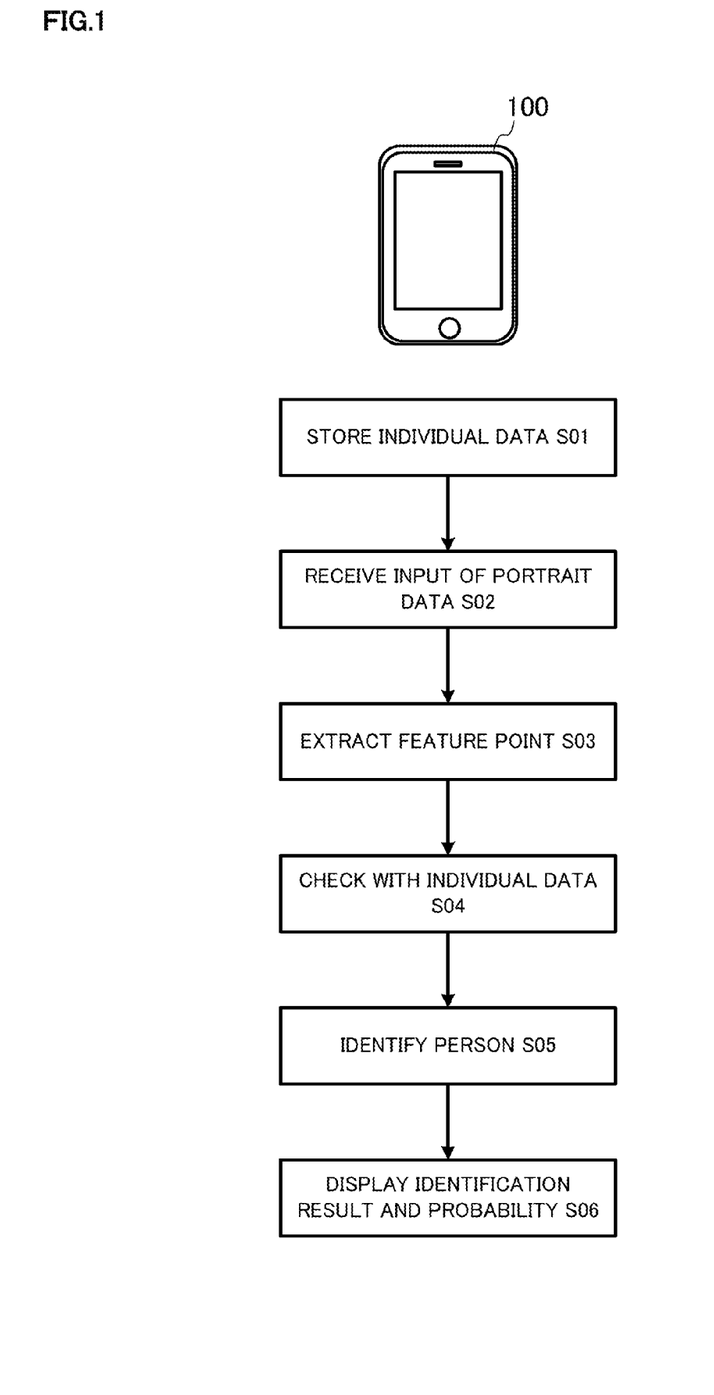
FIG. 1 shows a schematic diagram of the system for identifying a person depicted in a portrait 1.

A preferable embodiment of the present invention will be described below with reference to FIG. 1. FIG. 1 shows an overview of the system for identifying a person depicted in a portrait 1 according to a preferable embodiment of the present invention. The system for identifying a person depicted in a portrait 1 includes an information terminal 100.

In FIG. 1, the number of the information terminals 100 is not be limited to one and may be two or more. Furthermore, the information terminal 100 is not be limited to an actual device and may be a virtual device. Still furthermore, the information terminal 100 may be an external device such as a server or a terminal device that is not shown in the attached drawings.

The information terminal 100 is a terminal device that is capable to identify a person depicted in a portrait. Examples of the information terminal 100 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display.

The information terminal 100 previously stores different individual data depending on a plurality of persons (Step S01). For example, the information terminal 100 stores portrait data including a person and taken-image data including a person as individual data. The individual data pertain to, for example, a part or all of a person's face or body. The portrait data pertain to a portrait including a part or all of a person's face or body. The taken-image data pertain to a taken image including a part or all of a person's face or body.

The information terminal 100 receives input of portrait data of a portrait (Step S02). For example, the information terminal 100 takes an image of a portrait with an imaging device such as a camera and receives input of the taken image data of the portrait. More specifically, the information terminal 100 reads a portrait with a reader such as a scanner connected to the information terminal 100 itself and receives input of the portrait data. The portrait pertains to a painting including a part or all of a person's face or body.

The information terminal 100 extracts a feature point of the received portrait data by image analysis (Step S03). The information terminal 100 extracts a feature point of the portrait data. The information terminal 100 may extract a feature amount in addition to a feature point. In this time, the information terminal 100 extracts a feature point and a feature amount of each of the parts such as the eyes, ears, nose, mouth, mole position, lengths of a hand and a leg of a person depicted in portrait data.

The information terminal 100 checks the extracted feature point against the stored individual data (Step S04). The information terminal 100 checks the extracted feature point against a feature point of the stored individual data (Step S04). The information terminal 100 may change the check procedure based on whether data against which the extracted feature point is checked are the different portrait data or the different taken image data. For example, if data against which the extracted feature point is checked are different portrait data, the information terminal 100 checks the feature point of all of the portrait data and then of the each part. On the other hand, if data against which the extracted feature point is checked are different taken-image data, the information terminal 100 checks the feature point of each part of the portrait data. The change of the check procedure performed by the information terminal 100 is not limited to the above-mentioned example and can be appropriately performed.

The information terminal 100 identifies a person depicted in the portrait from the check result (Step S05). The information terminal 100 calculates a probability corresponding to the identical level to the person identified from the check result. For example, the information terminal 100 determines the correspondence level of each of a plurality of parts as an identical level and calculates a probability that indicates how much the person depicted in the portrait corresponds to the identified person according to the identical level.

The information terminal 100 displays the identification result together with a probability corresponding to the identical level (Step S06). If identifying a plurality of persons, the information terminal 100 displays a probability corresponding to the identical level on each of the persons. On the other hand, if identifying one person, the information terminal 100 displays a probability corresponding to the identical level of this person. The information terminal 100 may display the probability corresponding to the identical level of each part of the identified person. The information terminal 100 may also display a reason why this person is identified, together with the person. The information terminal 100 may also display property information including the background, name, address, and age of the identified person.

In the above-mentioned processes, the information terminal 100 may not necessarily perform any one of or a combination of any two or more of storing individual data, extracting a feature point, checking a feature point, and identifying a person. For example, the information terminal 100 may transmit portrait data to an external device such as a server or another terminal device that is not shown in the attached drawings, to have the external device to perform any one of or a combination of any two or more of the above-mentioned processes instead of the information terminal 100, and may receive the identification result from the external device.

System Configuration of System for Identifying Person Depicted in Portrait 1

Figure 2:
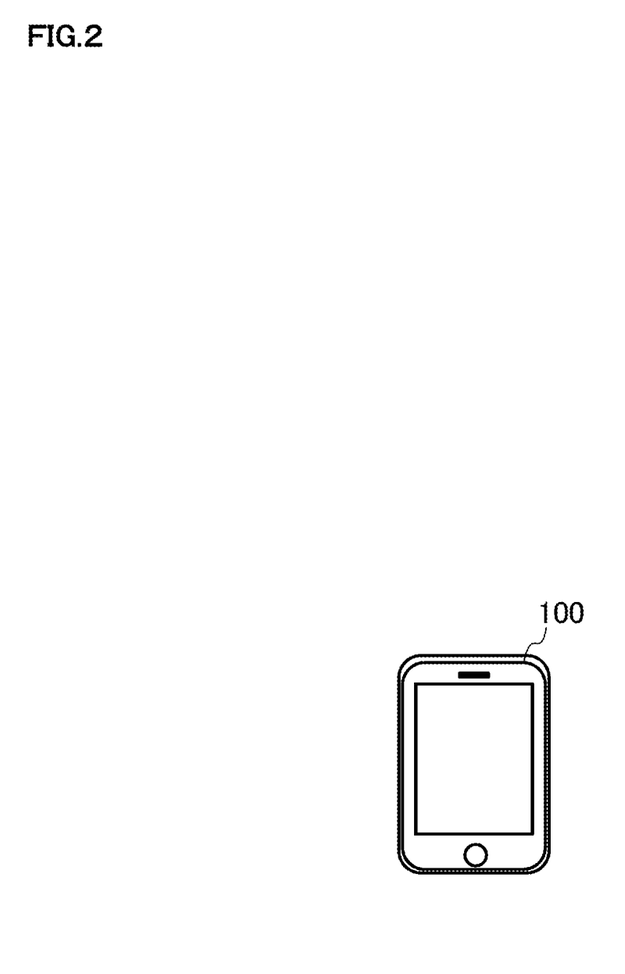
FIG. 2 shows an overall configuration diagram of the system for identifying a person depicted in a portrait 1.

A system configuration of the system for identifying a person depicted in a portrait 1 according to a preferable embodiment will be described below with reference to FIG. 2. FIG. 2 shows a system configuration of the system for identifying a person depicted in a portrait 1 according to a preferable embodiment of the present invention. The system for identifying a person depicted in a portrait 1 includes an information terminal 100. The number of the information terminals 100 is not be limited to one and may be two or more. Furthermore, the information terminal 100 is not be limited to an actual device and may be a virtual device. Still furthermore, the information terminal 100 may be connected with an external device such as a server or a terminal device that is not shown in the attached drawings.

The information terminal 100 is the above-mentioned terminal device with the functions to be described later.

Functions

Figure 3:
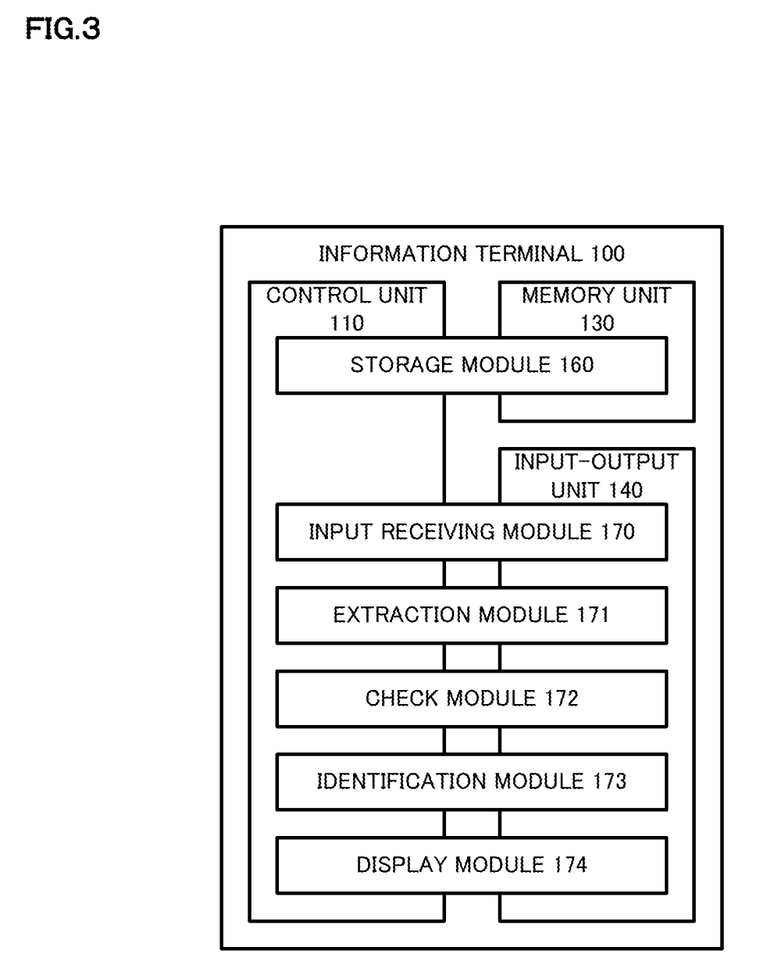
FIG. 3 shows a functional block diagram of the information terminal 100.

Functions of the system for identifying a person depicted in a portrait 1 according to a preferable embodiment will be described below with reference to FIG. 3. FIG. 3 shows a functional block diagram of the information terminal 100.

The information terminal 100 includes a control unit 110 such as a central processing unit (hereinafter referred to as "CPU"), a random access memory (hereinafter referred to as "RAM"), and a read only memory (hereinafter referred to as "ROM") and a communication unit not shown in the attached drawings, such as a device capable of communicating with other devices, for example a Wireless Fidelity or Wi-Fi® enabled device complying with IEEE 802.11. The information terminal 100 also includes a memory unit 130 such as a hard disk, a semiconductor memory, a record medium, or a memory card to store data. The information terminal 100 stores individual data such as different portrait data and taken-image data of a plurality of persons, which are to be described later, in the memory unit 130. The information terminal 100 also includes an input-output unit 140 including a display unit outputting and displaying data and images that have been processed by the control unit 110; and also including a touch panel, a keyboard, and a mouse that receive input from the user. The information terminal 100 also includes various devices such as an imaging device, for example, an imaging unit such as a camera, an analyzing device that perform various image analyses, an extraction device that extracts a feature point, a feature amount, etc., of portrait data, and an identification device that identifies a person included in the data.

In the information terminal 100, the control unit 110 reads a predetermined program to achieve a storage module 160 in cooperation with the memory unit 130. Furthermore, in the information terminal 100, the control unit 110 reads a predetermined program to achieve an input receiving module 170, an extraction module 171, a check module 172, an identification module 173, and a display module 174 in cooperation with the input-output unit 140.

Portrait Identification Process

The portrait identification process performed by the system for identifying a person depicted in a portrait 1 will be described below with reference to FIG. 4.

Figure 4:
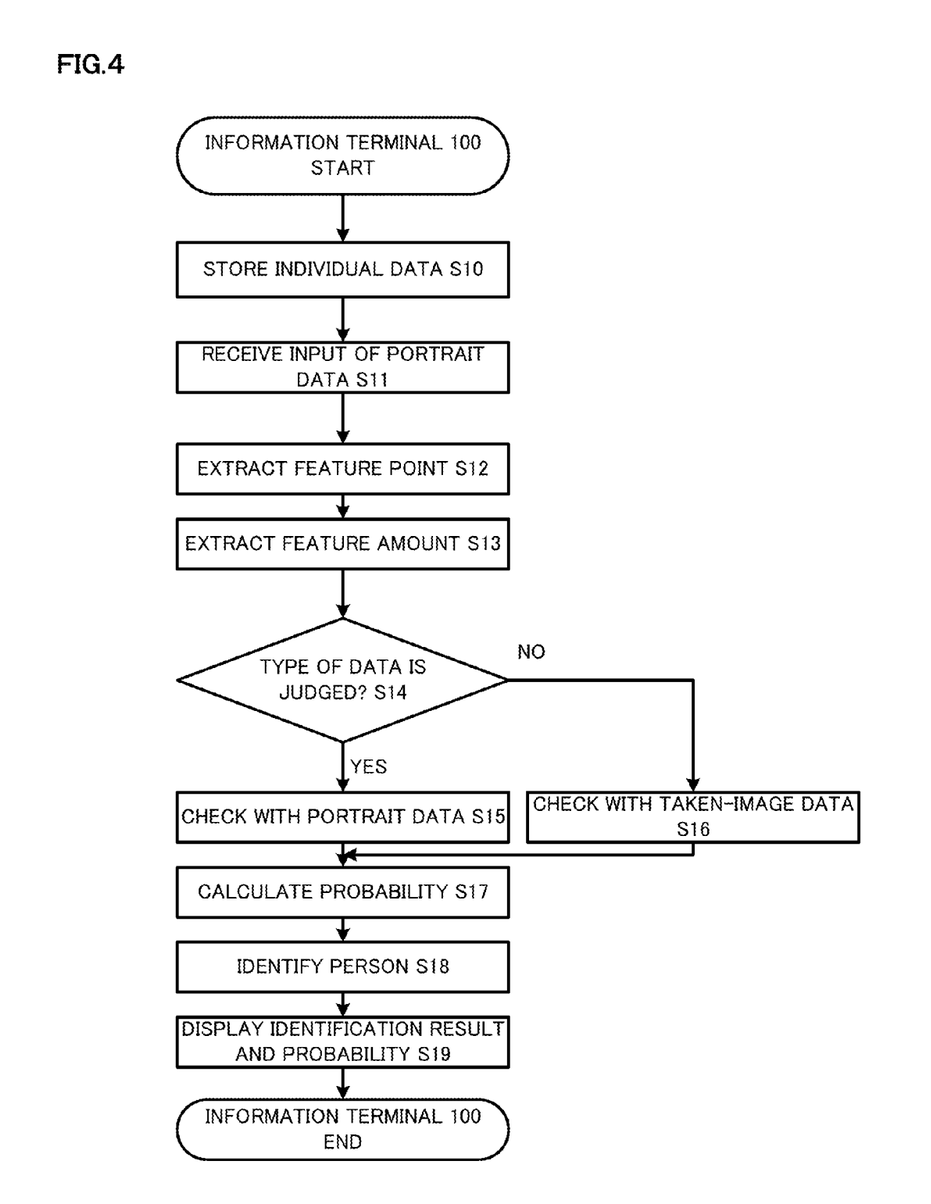
FIG. 4 shows the portrait identification process performed by the information terminal 100.

FIG. 4 shows a flow chart of the portrait identification process performed by the information terminal 100. The tasks executed by the modules will be described below with this process.

The storage module 160 stores different individual data depending on a plurality of persons (Step S10). In the step S10, the storage module 160 stores portrait data as data of a portrait including a person and taken-image data as data of a taken image including a person, as individual data. The portrait data pertains to a portrait including a part or all of the face or body. The taken-image data pertains to an image including a part or all of the face or body. For example, the storage module 160 stores individual data received from an external device.

The input receiving module 170 receives input of portrait data (Step S11). For example, in the step S11, the input receiving module 170 takes an image of a portrait with an imaging device such as a camera and receives input of the taken image of the portrait as portrait data. Alternatively, in the step S11, the input receiving module 170 reads a portrait with a reading device such as a scanner and receives input of the read portrait as portrait data. For example, the portrait is a painting in which a part or all of the face and the body is depicted.

The configuration of the input receiving module 170 is not limited to those mentioned above and may be the others to receive input of portrait data. Furthermore, the configuration of a portrait is not limited to those mentioned above. The portrait only has to include a part or all of a person.

The extraction module 171 extracts a feature point of the received portrait data by image analysis (Step S12). In the step S12, the extraction module 171 extracts a distinctive point of the portrait data to extract a feature point. For example, the extraction module 171 extracts each corner existing in image data to extract the position of the each corner as a feature point.

The extraction module 171 extracts a feature amount of the portrait data by image analysis (Step S13). In the step S13, the extraction module 171 extracts a feature amount of each of the parts such as the eyes, ears, nose, mouth, mole position, and lengths of a hand and a leg depicted in the portrait data. For example, the extraction module 171 extracts each part of the face and the body of a person that exists in the portrait data and then a feature amount such as the size, position, or angle of the each part.

The step S13 can be skipped. In this case, the information terminal 100 only has to perform processes to be described later based on the feature point after performing the step S12.

The check module 172 judges whether the type of data against which the extracted feature point and feature amount are checked is portrait data or taken-image data (Step S14). In the step S14, the check module 172 may receive input of the type of data from the user and judge the type of data based on the input, may judge that the type of data is the stored data if only one type of data are stored, or may judge the type of data based on a previously set condition. In the step S14, the check module 172 may check the extracted feature point or feature amount.

If the type of data is portrait data (YES) in the step S14, the check module 172 performs the process of the step S15 to be described later. On the other hand, if the type of data is taken-image data (NO) in the step S14, the check module 172 performs the process of the step S16 to be described later. Accordingly, the information terminal 100 changes the check procedure by a different process based on whether the data against which the extracted feature point is checked are the different portrait data or the different taken image data.

If the type of data is portrait data (YES) in the step S14, the check module 172 checks that the feature point and the feature amount that have been extracted from the received portrait data with portrait data stored as individual data (Step S15). In the step S15, the check module 172 first checks the feature point of all of the portrait data and then the feature point and the feature amount of the each part. For example, the check module 172 first checks the feature point of all of the face of a person included in the portrait data and then the feature point and the feature amount of the each part.

On the other hand, if the type of data is taken-image data (NO) in the step S14, the check module 172 checks the feature point and the feature amount extracted from the portrait data with taken-image data stored as individual data (Step S16). In the step S16, the check module 172 checks with the feature point and the feature amount of each part of the taken-image data. For example, the check module 172 first checks with a person included in the taken-image data and then the feature point and the feature amount of each part of the person's face.

The check module 172 performs a different check procedure in the steps S15 and S16 in this way.

The process of the above-mentioned steps S15 and S16 can be appropriately changed. For example, the information terminal 100 may perform a similar process in the steps S15 and S16. Furthermore, the process of the steps S15 and S16 checks with individual data in a different way. For example, in the steps S15 and S16, the information terminal 100 may check only the feature point.

The identification module 173 calculates a probability corresponding to the identical level of a person included in the portrait data to the person included in the individual data from the check result (Step S17). In the step S17, the identical level means how a person included in the portrait data corresponds to a person included in individual data. In the step S17, the identification module 173 calculates a probability corresponding to the identical level of each part of the person in addition to a probability corresponding to the identical level of the whole of the person. In the step S17, the identification module 173 calculates a probability corresponding to the identical level of each of the parts such as the eyes, ears, nose, mouth, mole position, and lengths of a hand and a leg in the portrait data. The identification module 173 calculates a probability corresponding to the identical level as the whole of a person based on the probability of the each part. For example, the identification module 173 figures out that the probability is 80% as the whole of a person if the probabilities of the eyes and the other parts are 90% and 80%, respectively.

In the step S17, the calculation of a probability corresponding to the identical level that the identification module 173 performs is not limited to those described above and can be appropriately changed. The identification module 173 may calculate a probability of a person based on the one part or the two or more parts or based on a predetermined specific part or may calculate the probability in other ways.

The identification module 173 identifies a person depicted in the portrait based on the check result and the calculated probability (Step S18). In the step S18, the identification module 173 identifies a person depicted in the portrait based on a criterion for judgement, for example, whether or not the probability as the whole of a person is a predetermined value or more or whether or not the probability as the whole of a person or the probability of each part is small but not zero. For example, after the identification module 173 checks with portrait data stored as individual data, if the probability as the whole of a person or the probability of each part is small but not zero, the identification module 173 identifies all the individual data with this probability as the person depicted in the portrait. At this time, the identification module 173 identifies one or more individual data as the person depicted in the portrait.

The display module 174 displays the identification result together with the probability corresponding to the identical level (Step S19). In the step S19, the display module 174 displays the identified person together with the probability of this person. If a plurality of persons are identified as the result, the display module 174 displays each of the persons together with the probability of the each of the persons. The display module 174 displays any one of portrait data and taken-image data of the identified person or the both.

Figure 5:
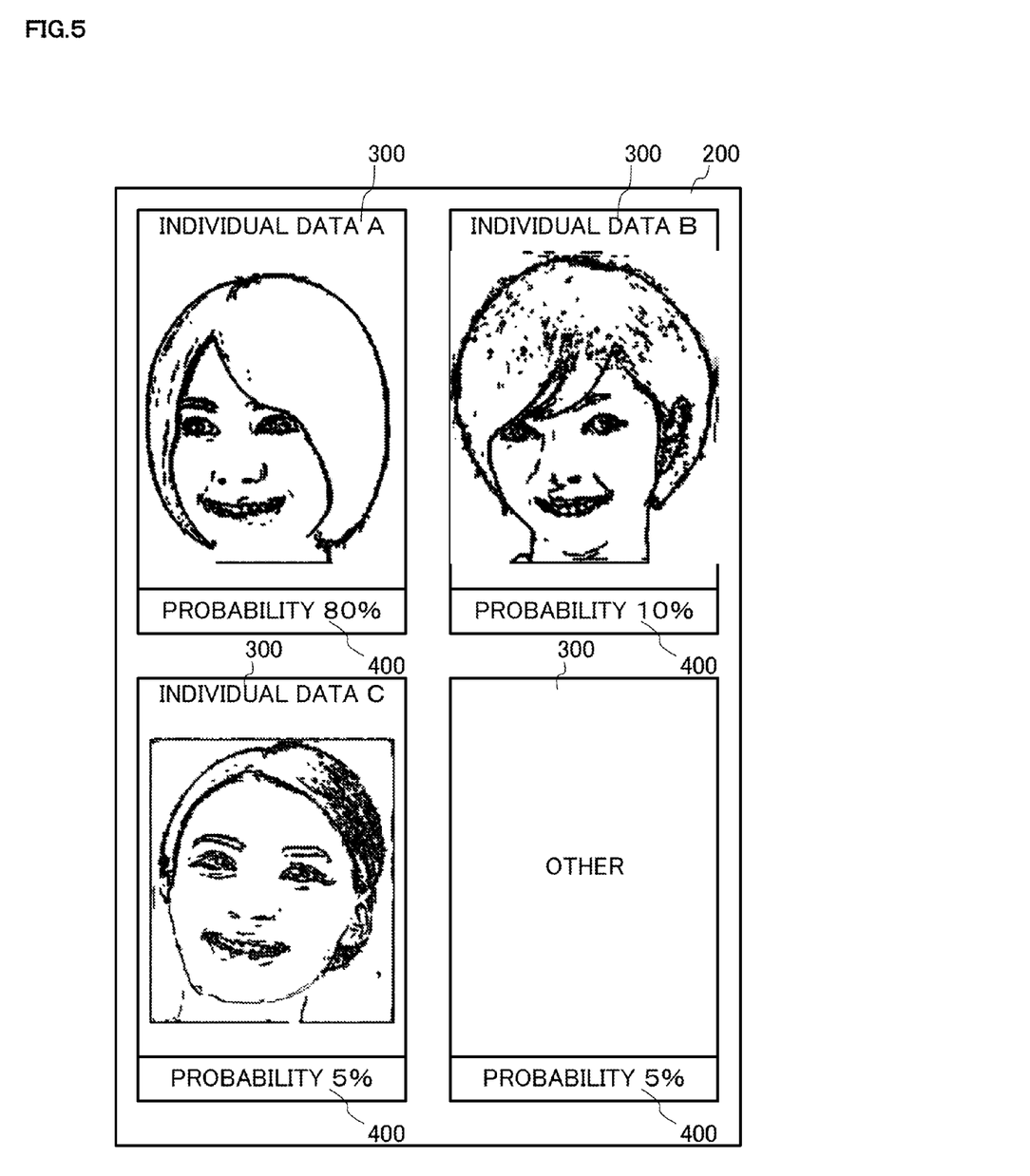
FIG. 5 shows an example where the information terminal 100 displays an identification result and probabilities.

FIG. 5 shows an example where the display module 174 displays an identification result together with the probability corresponding to the identical level. In FIG. 5, the display module 174 displays a data display area 200, an individual data display area 300, and a probability display area 400. The display module 174 displays a plurality of individual data display areas 300 and a plurality of probability display areas 400 in the respective data display areas 200. The display module 174 displays the individual data of an identified person in the individual data display areas 300. This individual data is any one of portrait data and taken-image data or the both stored in the storage module 160. The display module 174 displays a probability display area 400 in the bottom of each of the data display area 300. The display module 174 displays a probability corresponding to the identical level of the individual data displayed in each of the individual data display areas 300 in its probability display area 400. The display module 174 displays individual data in descending order according to probability.

In FIG. 5, the display module 174 displays the individual data A in an individual data display area 300 and a probability of 80% corresponding to the identical level of the individual data A in the probability display area 400. The display module 174 displays the individual data B in an individual data display area 300 and a probability of 10% corresponding to the identical level of the individual data B in the probability display area 400. The display module 174 displays the individual data C in an individual data display area 300 and a probability of 5% corresponding to the identical level of the individual data C in the probability display area 400. The display module 174 displays "other" in an individual data display area 300 and a probability of 5% corresponding to the identical level of this "other" individual data in the probability display area 400. The "other" is also displayed if the corresponding individual data does not exist or if the number of the corresponding individual data exceeds a predetermined number. As the above-mentioned individual data A to C, the respective taken-image data are displayed.

The number, the position, and the shape of the individual data display areas 300 and the probability display areas 400 that the display module 174 displays can be appropriately changed. The individual data A to C are not limit to taken-image data and may be portrait data.

In the step S19, the display module 174 displays the probability of each part of the identified person. For example, the display module 174 may display the calculated probabilities near the respective parts, the calculated probabilities together with a lead line, etc., specifying the respective parts or the name of parts and the probabilities of the respective parts. The display module 174 may display a probability in a way other than those described above. For example, in FIG. 5, the display module 174 only has to display probabilities of the respective parts of individual data.

In the step S19, the display module 174 also displays a reason why this person is identified, together with the person. For example, the display module 174 displays notification that this person is identified because the probabilities of all of the parts exceed a predetermined value, because the probabilities of some of the parts exceeds a predetermined value, or because the probabilities of all of the parts do not exceed a predetermined value, however this person has a higher probability as the whole of a person than any other identified persons. The display module 174 may display a reason in a way other than those described above. For example, in FIG. 5, the display module 174 only has to display individual data or a probability together with the reason.

Figure 6:
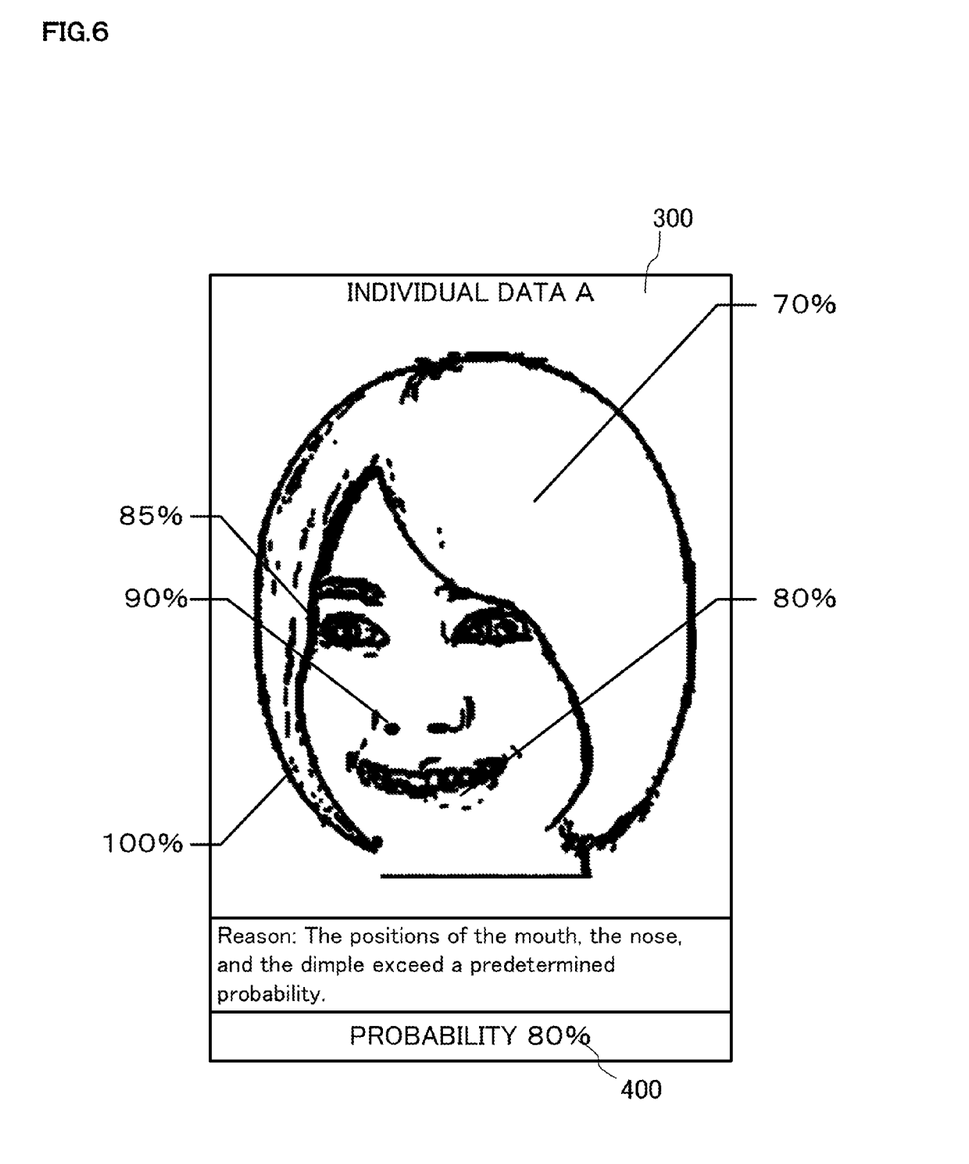
FIG. 6 shows an example where the information terminal 100 displays an identification result, probabilities, and a reason.

FIG. 6 shows an example where the display module 174 displays the probability of each part of an identified person together with a reason why this person is identified. FIG. 6 shows the individual data A shown in FIG. 5 as an example. The display module 174 displays the probability of each part of the identification data displayed in each of the individual data display areas 300 shown in FIG. 5 together with a reason why this person is identified. In FIG. 6, the display module 174 displays the individual data A in its individual data display area 300 and a probability of 80% corresponding to the identical level of the individual data A in the probability display area 400. The display module 174 also displays a leader line from each of the parts such as the eyes, nose, mouth, and dimple of the individual data A and a probability corresponding to the identical level of each of these parts. The display module 174 displays that the identical levels of the eyes, the nose, the mouth, and the dimple are 85%, 90%, 80%, and 10%, respectively. The display module 174 also displays that the probabilities corresponding to the identical levels of the parts exceed a predetermined value as a reason why the taken-image data of this individual data A is identified. The display module 174 displays "The positions of the mouth, the nose, and the dimple exceed a predetermined probability." as a reason.

The display forms and the contents of the probability of each part and of the reason that the display module 174 displays can be appropriately changed and are not limited to those mentioned above. The display module 174 may display only any one of the probability of each part and the reason.

Figure 7:
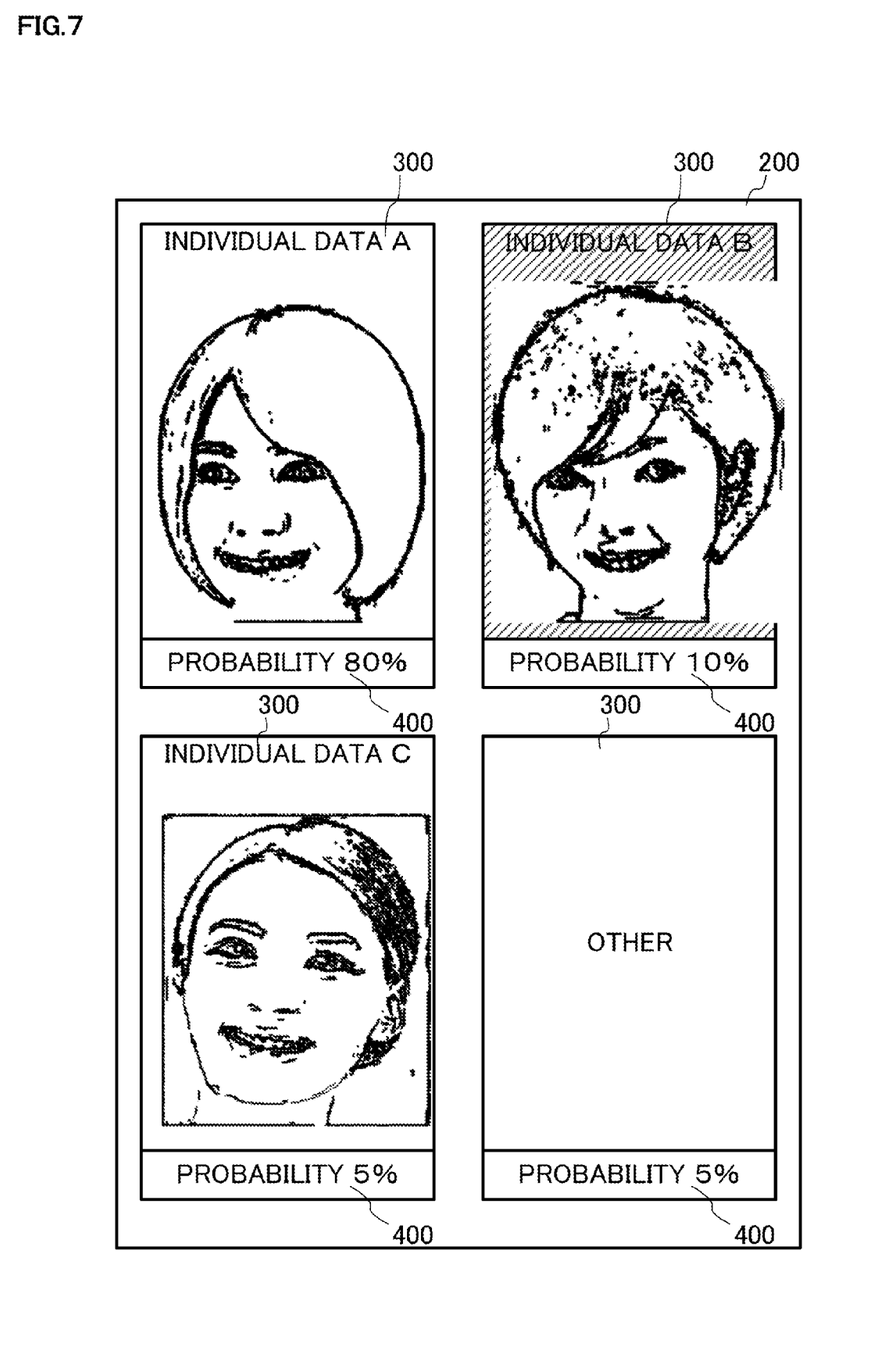
FIG. 7 shows an example where the information terminal 100 displays an identification result, probabilities, and the highlight of identification data.

Furthermore, the display module 174 may highlight individual data that have a low probability corresponding to the identical level but a high probability completely corresponding to the identical level of each part. Specifically, the display module 174 may highlight individual data that have a low probability corresponding to the identical level but completely correspond to the identical level of each part, for example, to the shapes and the positions of the eyes or the mole.

FIG. 7 shows an example where the display module 174 displays the probabilities of identified persons and the highlight of individual data. The display module 174 displays the approximately same contents as those shown in FIG. 5 but highlights the individual data B. The display module 174 supposes that the individual data B is a person depicted in the portrait and highlights the individual data B because the probability corresponding to the identical level is lower than that of the individual data A, but the probabilities approximately correspond to the identical level of other parts, such as the position of the mole and the size of eyes.

The highlight display form displayed by the display module 174 can be appropriately changed. The display module 174 may intensify the display of individual data in a form other than highlight. For example, the display module 174 may enlarge, blink, or voice-output the display of the most likely corresponding individual data more than any other individual data or may reduce individual data other than the most likely corresponding individual data.

In the step S19, the display module 174 also displays property information together with an identified person. For example, the property information pertains to the background, name, address, age, etc. of a person. For example, the display module 174 may display the property information of an identified person near this person or with a lead line specifying this person. The display module 174 may display property information in a way other than those mentioned above. For example, in FIG. 5, the display module 174 only has to display property information together with individual data.

Figure 8:
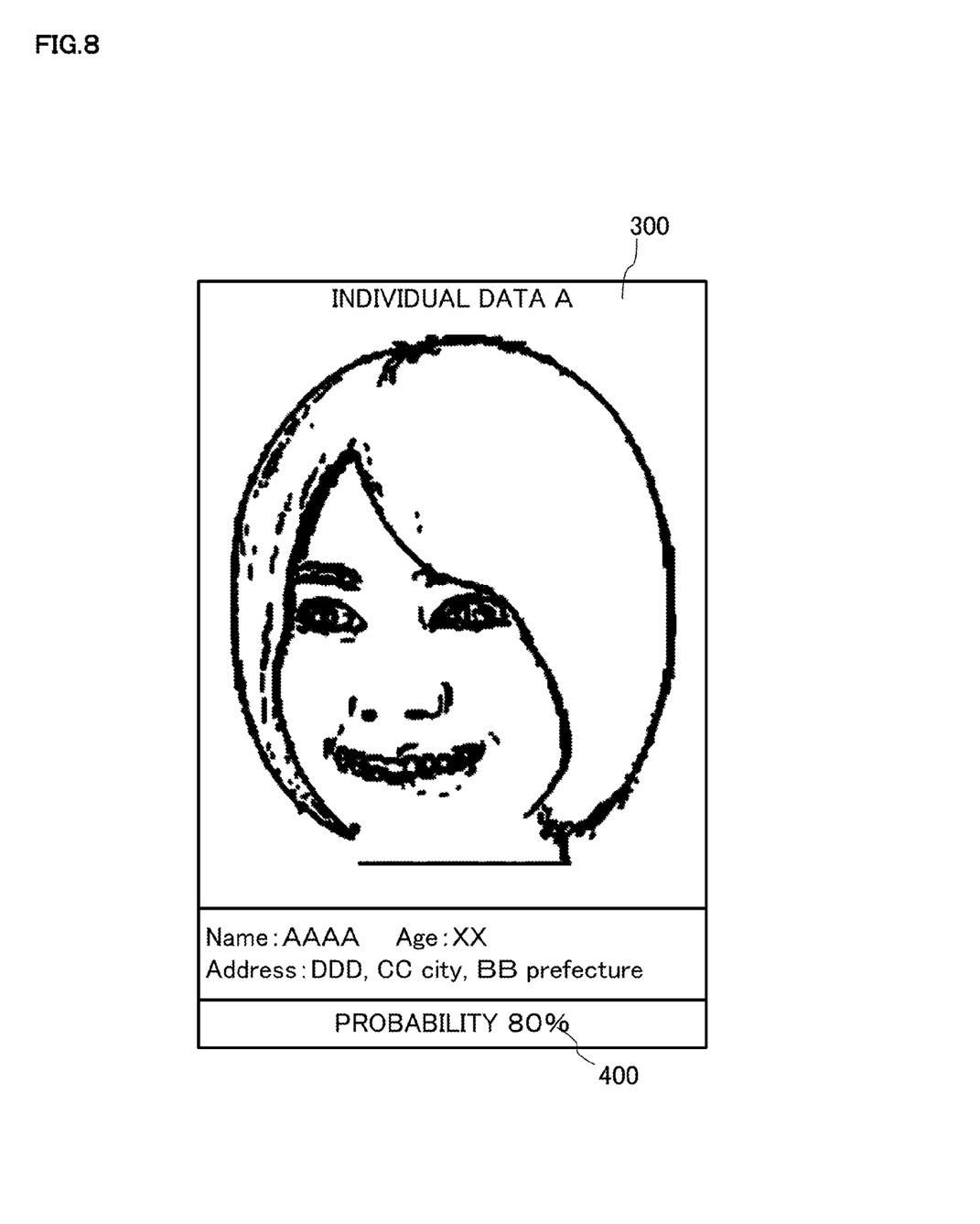
FIG. 8 shows an example where the information terminal 100 displays an identification result, a probability, and property information.

FIG. 8 shows an example where the display module 174 displays the probability and the property information of an identified person. FIG. 8 shows that the display module 174 displays the individual data A shown in FIG. 5 as an example. The display module 174 displays the property information of the identification data displayed in each of the individual data display areas 300 shown in FIG. 5. The property information pertains to the name, age, address, background, etc. of identification data. In FIG. 8, the display module 174 displays the name, age, and address as property information. The property information is associated with individual data and displayed by the display module 174.

The property information may not limit to those mentioned above and may other information pertaining to a person. The display form and the display location of property information are not limited to those mentioned above and may be appropriately changed.

In the processes mentioned above, the information terminal 100 may not necessarily have any one of or the combination of any two or more of the storage module 160, the extraction module 171, the check module 172, and the identification module 173. For example, these modules may be performed by an external device not shown in the attached drawings. In this case, the information terminal 100 only has to transmit portrait data to an external device to have the external device execute these processes and receive the execution result. If performing some of these modules, an external device only has to have a configuration to perform the processes.

Furthermore, the display module 174 may display any one of or the combination of any two or more of the above-mentioned data. For example, the display module 174 may display individual data, the probability of each part of the individual data, the probability corresponding to the identical level, the reason for the identification, and the property information, may display individual data, the probability corresponding to the identical level, the reason for the identification, the highlight, and the property information, or may display the other combinations.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 System for identifying person depicted in portrait
100 Information terminal

What is claimed is:

1. A system for identifying a person depicted in a portrait, comprising:
   a receiving unit that receives input of portrait data of the portrait, the portrait pertaining to a painting including a part or all of a person's face or body;
   a memory unit that stores different individual data depending on a plurality of persons;
   an extraction unit that extracts a feature point of the received portrait by image analysis;
   a check unit that checks the extracted feature point against the individual data;
   an identification unit that identifies a person depicted in the portrait from the check result; and
   a display unit that displays the identification result together with a probability corresponding to an identical level,
   wherein the different individual data include different portrait data and different taken image data, each of the different taken image data pertaining to a taken image of a part or all of a person's face or body, and the check unit changes the check procedure based on whether data against which the extracted feature point is to be checked are the different portrait data or the different taken image data.

2. The system according to claim 1, wherein the extraction unit extracts a feature amount of each part of the received portrait data, and the check unit checks the extracted feature amount of the each part against the same each part of the stored individual data.

3. The system according to claim 1, wherein the display unit displays a probability corresponding to the identical level of each part of the received portrait data.

4. The system according to claim 1, wherein the display unit displays probabilities corresponding to the respective identical levels together if the number of the identified persons is two or more.

5. The system according to claim 1, wherein the display unit displays a reason why the person is identified.

6. The system according to claim 1, wherein the display unit displays property information on the identified person.

7. A method for identifying a person depicted in a portrait, comprising:
   receiving input of portrait data of the portrait, the portrait being a painting including a part or all of a person's face or body;
   storing different individual data depending on a plurality of persons;
   extracting a feature point of the received portrait by image analysis;
   checking the extracted feature point against the individual data;
   identifying a person depicted in the portrait from the check result; and
   displaying the identification result together with a probability corresponding to an identical level,
   wherein the different individual data include different portrait data and different taken image data, each of the different taken image data pertaining to a taken image of a part or all of a person's face or body, and the check procedure is changed based on whether data against which the extracted feature point is to be checked are the different portrait data or the different taken image data.

8. A computer program product for use in a system for identifying a person depicted in a portrait, comprising a non-transitory computer usable medium having a set of instructions physically embodied therein, the set of instructions including computer readable program code, which when executed by the system causes the information processing unit to:
   receive input of portrait data of the portrait, the portrait being a painting including a part or all of a person's face or body;
   store different individual data depending on a plurality of persons;

extract a feature point of the received portrait by image analysis;
check the extracted feature point against the individual data;
identify a person depicted in the portrait from the check result; and
display the identification result together with a probability corresponding to an identical level,
wherein the different individual data include different portrait data and different taken image data, each of the different taken image data pertaining to a taken image of a part or all of a person's face or body, and the check procedure is changed based on whether data against which the extracted feature point is to be checked are the different portrait data or the different taken image data.

* * * * *